US007200684B1

(12) United States Patent
Schales et al.

(10) Patent No.: US 7,200,684 B1
(45) Date of Patent: Apr. 3, 2007

(54) NETWORK DATA PACKET CLASSIFICATION AND DEMULTIPLEXING

(75) Inventors: Douglas Lee Schales, South Salem, NY (US); Srinivasan Seshan, Scarsdale, NY (US); Miriam Zohar, New Hempstead, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/548,141

(22) Filed: Apr. 13, 2000

(51) Int. Cl.
*G06F 15/16* (2006.01)
(52) U.S. Cl. .................... 709/252; 709/200; 709/223; 709/224; 370/351; 370/389; 370/401
(58) Field of Classification Search ............. 709/223, 709/201, 238, 200, 224, 225, 232, 252; 370/381, 370/389, 400, 401
See application file for complete search history.

(56) References Cited

U.S. PATENT DOCUMENTS

| | | | | |
|---|---|---|---|---|
| 5,463,773 A | * | 10/1995 | Sakakibara et al. | 707/102 |
| 5,509,006 A | * | 4/1996 | Wilford et al. | 370/401 |
| 5,574,910 A | * | 11/1996 | Bialkowski et al. | 707/1 |
| 5,995,971 A | * | 11/1999 | Douceur et al. | 707/102 |
| 6,041,053 A | * | 3/2000 | Douceur et al. | 370/389 |
| 6,292,465 B1 | * | 9/2001 | Vaid et al. | 370/230 |
| 6,320,848 B1 | * | 11/2001 | Edwards et al. | 370/255 |
| 6,412,000 B1 | * | 6/2002 | Riddle et al. | 709/224 |
| 6,498,795 B1 | * | 12/2002 | Zhang et al. | 370/400 |
| 6,549,521 B1 | * | 4/2003 | Edwards et al. | 370/255 |
| 2002/0143939 A1 | * | 10/2002 | Riddle et al. | 709/224 |

* cited by examiner

*Primary Examiner*—Ario Etienne
*Assistant Examiner*—LaShonda Jacobs
(74) *Attorney, Agent, or Firm*—Ido Tuchman; Lisa M. Yamonaco

(57) ABSTRACT

The present invention provides methods and apparatus for classifying and demultiplexing packets in a network protocol stack. It provides extendibility for packet processing in the network protocol stack by defining a standard method for adding new functionality. It provides a method to obtain external information, from an application scheduled outside of the forwarding or interrupt context of the kernel, in order to augment packet classification and/or augment packet disposition. In some embodiments, external information augments a criteria of a node in a classification tree with additional information. It presents a way of augmenting which suspends the classification process until an application, scheduled outside of the forwarding or interrupt context of the kernel, completes. The resulting external information is used to augment the packet classification. In some embodiments of the method, the external information includes authentication of an originator of the packet by correlating a tunnel id with a userid, and/or using s/ident for out of band authentication. The classification process enables enforcement of a site policy.

26 Claims, 7 Drawing Sheets

700

No_Match - Didn't match the packet; continue normal tree traversal
Match_OK - Matched the packet; continue normal tree traversal
Match_This - Matched this node; execute the packet action code immediately
Match_Discard - Matched the packet; immediately discard the packet
Match_Forward - Matched the packet; immediately forward the packet

900

```
PP_NotOK - Stop tree traversal
PP_OK - Continue tree traversal
PP_Discard - Immediately stop traversing the tree; discard the packet
PP_Forward - Immediately stop traversing the tree; forward the packet.
```

```
OK_Discard - Reverse traverse the tree for postprocess;
              recommend to discard the packet.
OK_Forward - Reverse traverse the tree for postprocessing;
              recommend to forward the packet.
Stop_Discard - Discard the packet immediately without reverse traversing the tree.
Stop_Forward - Forward the packet immediately without reverse traversing the tree.
OK_Local - Accept the packet locally.
OK_Redirect - Redirect the packet to a foreign host.
```

FIGURE 10.

NETWORK DATA PACKET CLASSIFICATION AND DEMULTIPLEXING

FIELD OF THE INVENTION

The present invention is directed to the field of packet communication. It is more particularly directed to classification and demultiplexing of network communication packets processed in a network protocol stack.

BACKGROUND OF THE INVENTION

Communication over a network often requires the information that is to be transported from one computer to another be divided into network communication packets. These network communication packets, simply referred to as "packets", are transported across the physical communication network.

The information originating from an application program becomes packetized into network communication packets by passing through various software components before arriving at the network interface card for transmission on the physical communications network. These software components are typically layered to form what is known as the network protocol stack. Each layer is responsible for a different facet of communication. For example, the TCP/IP protocol stack is normally split into four layers: link, network, transport and application. FIG. 1 shows the relationship between the protocol layers and the TCP/IP protocol stack. The link layer 101 is responsible for placing data on the physical network. The network layer 102 is responsible for routing. The transport layer 103 is responsible for the communication between two hosts. The application layer 104 is responsible for processing the application specific data.

For example, FIG. 2 illustrates the stages of an HTTP request being encapsulated before being sent to a web server. As the request descends the protocol stack, each layer 201–204 encapsulates the packet adding its own header. When the HTTP packet arrives at the destination address, each protocol layer uses information within its header to classify the incoming packet amongst all the protocols in the layer above it. This process is commonly referred to as demultiplexing.

At each layer in the network protocol stack, the packet is demultiplexed or "classified" based on information about the packet that is contained in the headers or from information inside the data portion of the packet itself. The packet is processed differently based on its classification.

For example, FIG. 3 illustrates how this classification is done for an incoming HTTP request 301. The Ethernet driver 302, in the link layer 300, classifies the packet based on frame type in the Ethernet header and passes it to IPv4 312 in the network layer 310. IPv4 312 classifies the packet based on the IP header protocol value in the IP header and passes it to TCP 323 in the transport layer 320. TCP classifies the packet based on the destination port number in the TCP header and passes it to the HTTP server 332 in the application layer 330.

Traditional packet classification systems, as found in BPF, DPF, Pathfinder, Router Plugins, operating systems and many firewalls, are limited to a set of fixed pattern matching rules. This allows a user to intercept/process any packet that matches the desired set of values in the appropriate byte ranges (usually a combination of the IP and the protocol header fields, such as source/destination address, protocol or source/destination ports). These packets are then passed to a software module that processes the packets and can modify, forward, drop or delay them. Stateful packet filtering systems generally have the ability to generate and add rules dynamically based on application traffic. However, such systems do not provide simple methods to extend packet processing to understand new application protocols.

These traditional systems may work well for applications that use a single connection to a well known destination address and port. However, many modern applications initially use a well known service port for the control session and then use additional connections on ephemeral port numbers for each data stream. Examples of such applications are FTP, Real Audio and H.323. To support these applications efficiently, the traditional systems must allow packet matching filter rules to be updated dynamically and quickly. In addition, some modern protocols have abandoned using fixed format headers and fixed sized fields. For example, HTTP makes its header human readable by encoding them as strings.

SUMMARY OF THE INVENTION

It is thus an aspect of the present invention to provide greater flexibility in classifying and demultiplexing packets in the network protocol stack. As a result, it provides a method for application level classification. This is due to classifying techniques and a modular structure described subsequently.

Another aspect of the present invention provides easier extendibility for packet processing in the network protocol stack by defining a standard method for adding new functionality or support for new protocols and applications.

Another aspect of the present invention provides methods and apparatus to obtain external information, from an application scheduled outside of the forwarding or interrupt context of the kernel, in order to augment packet classification and/or disposition.

An example embodiment of the present invention is a method for classifying a data packet. The method includes the steps of: receiving the packet at a root node of a classification tree; passing the packet to a first child node of a first tree level of the classification tree indicating a satisfaction of a node-criteria of the first child node; the first child node forming the data packet into a matched packet; and repeating the step of passing and forming for a next tree level until no first child node of the next level at a succeeding next level indicates satisfaction of the node-criteria of the first child node of the next level.

In some embodiments the step of indicating includes the step of executing a set of code which returns a status indication of the type; and/or the step of indicating satisfaction of a criteria includes the steps of executing a set of code which identifies the desired packet and returning a status indication; and/or the step of forming the data packet into a matched packet includes the step of indicating satisfaction; and/or the step of repeating the step of passing and the step forming includes the steps of indicating and returning a status indication of NO_Match.

In some embodiments of the method, the method further includes: the step of adding at least one new child node; and/or one new child node is a Real Audio node; and/or the method is extendible such that one or more nodes are dynamically added at any level; parsing the matched packet and generating relevant information; transforming the matched packet into a transformed packet; and/or associating the packet at a last first child node indicating satisfaction; executing a set of code in accordance with the last first child node; and/or the step of forming includes the first child node specifying a set of code to be run subsequently; and/or the step specifying specifies the set of code to be run following classification.

Another example embodiment of the present invention is a method which uses an external process for classifying a packet. This method includes the steps of suspending a classification process in progress for the packet, and obtaining external information employed in the classifying. This is performed by an application scheduled outside of the forwarding or interrupt context of the kernel.

In some embodiments of the method, the step of suspending includes the steps of queuing any data, including information about the packet or its present classification; and/or transferring said data to an application that is scheduled outside of the forwarding or interrupt context of the kernel.

In some embodiments of the method, the step of obtaining external information includes augmenting a node-criteria of a node in a classification tree with additional information; and/or the external information includes authentication of an originator of the packet; the classification process is an extendible classifier process (In one application, a process is extendible by adding a new child node); and/or the step of specifying includes enforcement of a site policy. A site policy is composed of a number of different aspects including security. The security aspect of a site policy may be based on packet classification and authentication information.

Another aspect of the present invention is a method for determining disposition of an original packet received at a child node. The method includes the step of passing the original packet and a first disposition of the original packet to an external process, and the external process augmenting the original packet and/or augmenting the first disposition by employing a process specific means and returning an augmented packet and an augmented disposition to the child node. Some embodiments of the method include suspending a disposition process in progress for the original packet; and/or the augmented disposition includes identification of and/or authentication of an originator of said packet.

BRIEF DESCRIPTION OF THE DRAWINGS

These and other aspects, features, and advantages of the present invention will become apparent upon further consideration of the following detailed description of the invention when read in conjunction with the drawing figures, in which:

FIG. 9 shows an example of pp_t return codes in accordance with the present invention;

FIG. 10 shows an example of paction_t return codes in accordance with the present invention.

DETAILED DESCRIPTION OF THE INVENTION

Figure 1:
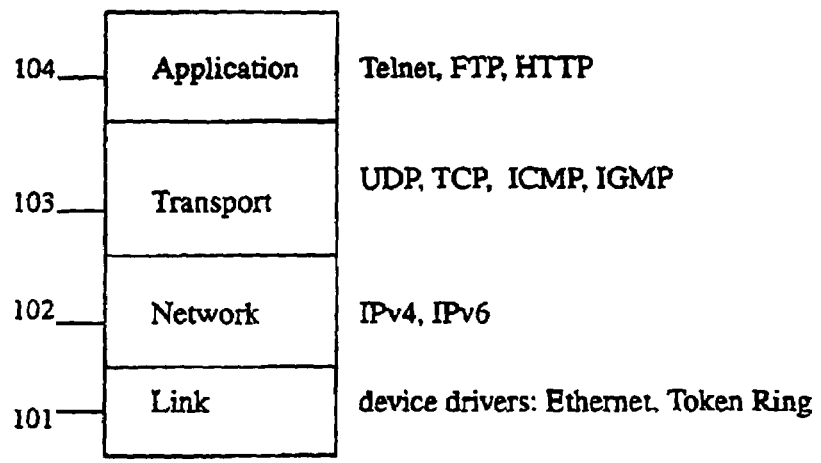
FIG. 1 shows the relationship between the protocol layers and the TCP/IP protocol stack.
Figure 2:
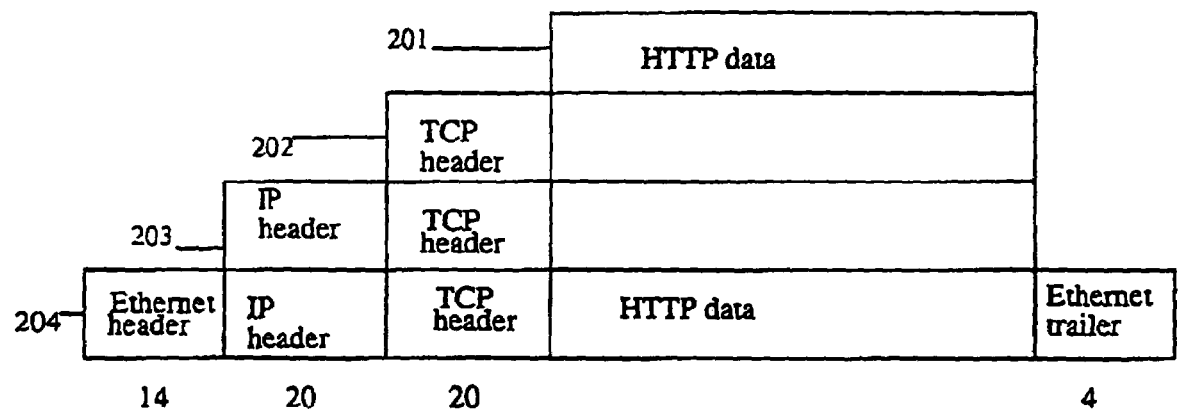
FIG. 2 illustrates the stages of an HTTP request being encapsulated before being sent to a web server.
Figure 3:
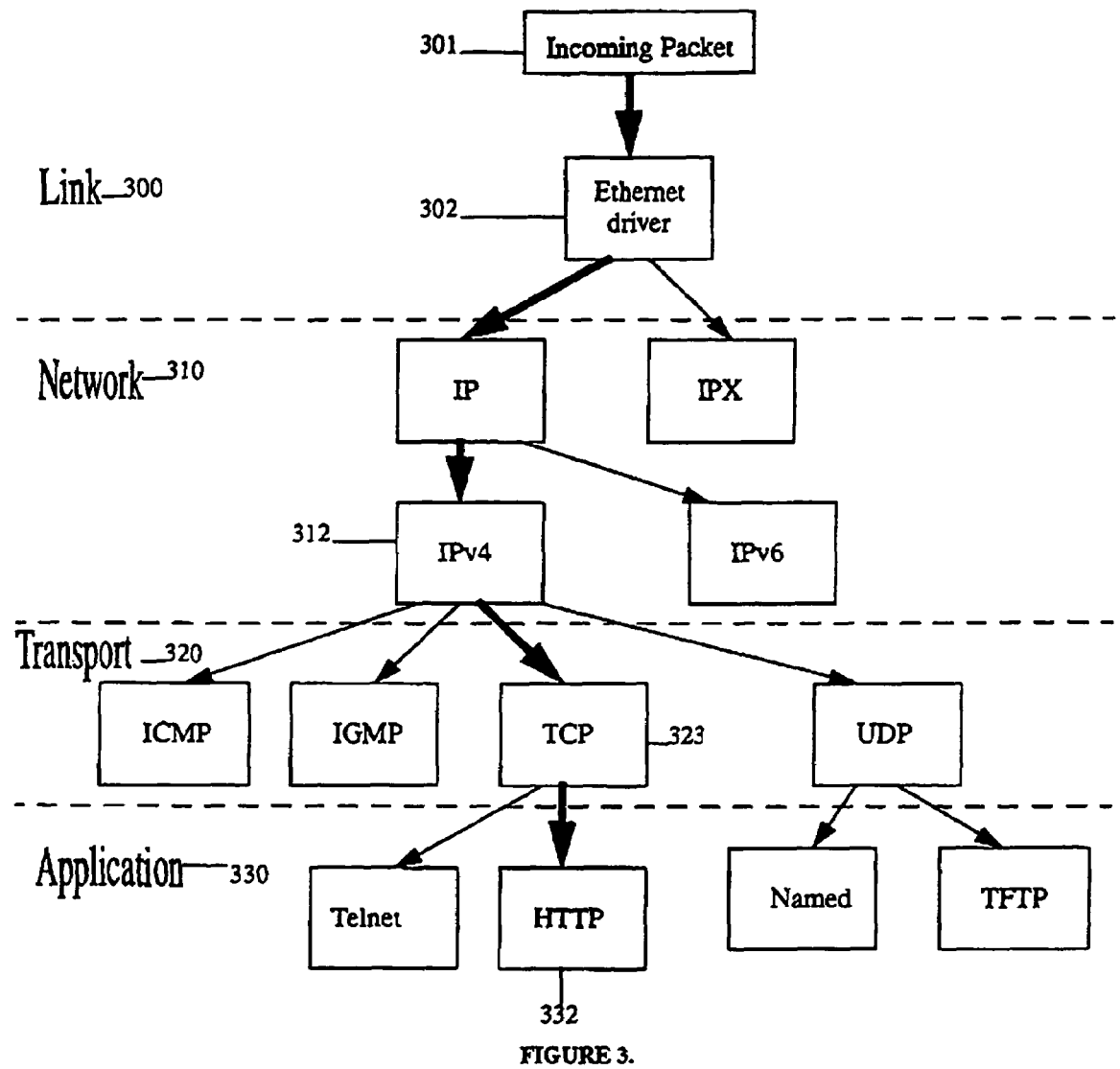
FIG. 3 illustrates how classifying is done for an incoming HTTP request.

Networking protocols are normally divided into layers which are responsible for different facets of communication as FIG. 1 depicts for the network layers of the TCP/IP protocol. The associated call graph created by the standard UNIX protocol stack is arranged like a tree as described for FIG. 3. Each level of the tree corresponds to a different layer in the networking protocol stack. The present invention mimics the call graph of the UNIX protocol stack and organizes the different modules competing for packets at the IP layer in a tree structure herein referred to as a classification tree.

Figure 4:
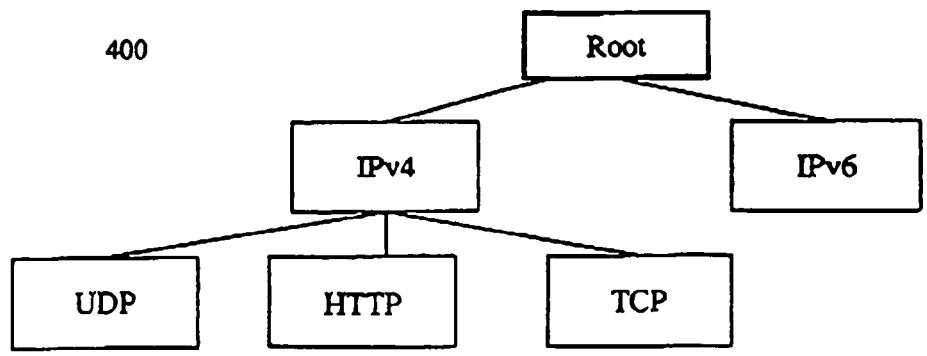
FIG. 4 shows an example of how to organize modules in the classification tree in accordance with the present invention.

An example of a classification tree 400 is shown in FIG. 4. FIG. 4 shows each node in the classification tree as a separate module. In an embodiment of the present invention each node is composed of 4 packet traversal functions (matcher, preprocessor, action, and post processing) and 3 node management functions (callback, heartbeat and management). Only the packet matching function, which identifies the packets to process, and the packet action function, which determines the packet disposition, are required. The packet matching function is herein referred to as the node-criteria of the node. The remaining traversal and management function pointers can default to NULL. These functions associated with each node are stored in a PacketFilter structure.

Since each of the nodes is a separate dynamically loadable module, the classification tree organization is flexible. In an embodiment of the present invention, the modules are loaded into memory during the initialization process. Based upon configuration information the modules are then arranged to form a classification tree. The ordering of the modules is important since the packet traversal is governed by this ordering. As the classification tree is created, each node is initialized by executing a set of code. In the embodiment, this set of code is a function referred to as the management function(mm). The input parameter to the mm function is generally a single pointer to a buffer containing the node specific configuration data.

FIG. 4 shows an example of how to organize modules in the classification tree. The IPv4 503, IPv6 504, UDP 506, HTTP 507 and TCP 508 modules each wish to observe or modify packets that use the protocol for which they are named. However, in this example, there are multiple ways one could imagine wanting to process HTTP requests. These ways include: providing a transparent HTTP proxy function, using a specialized TCP for HTTP like Transaction TCP(T/TCP), doing content filtering based on site policy, or limiting packet traffic based on a service contract. Depending on the intended purpose of the classification tree, differing modules are loaded into memory. A site policy is composed of a number of different aspects including security. The security aspect of a site policy may be based on packet classification and authentication information. Once initialization completes, the classification tree may be modified by adding, deleting or moving a node. This ability of modifying the classification tree makes the packet classification process extendible.

The present invention includes methods for implementing a packet classification process and/or an augmented packet disposition process. The packet to be classified and/or augmented is herein referred to as the original packet. The resulting packet is referred to as the augmented packet. The disposition of the original packet is herein referred to as the first disposition, and the disposition resulting from the augmented disposition process is herein referred to as the augmented disposition. Anything outside of the forwarding or interrupt context of the kernel is herein said to be external.

Figure 5:
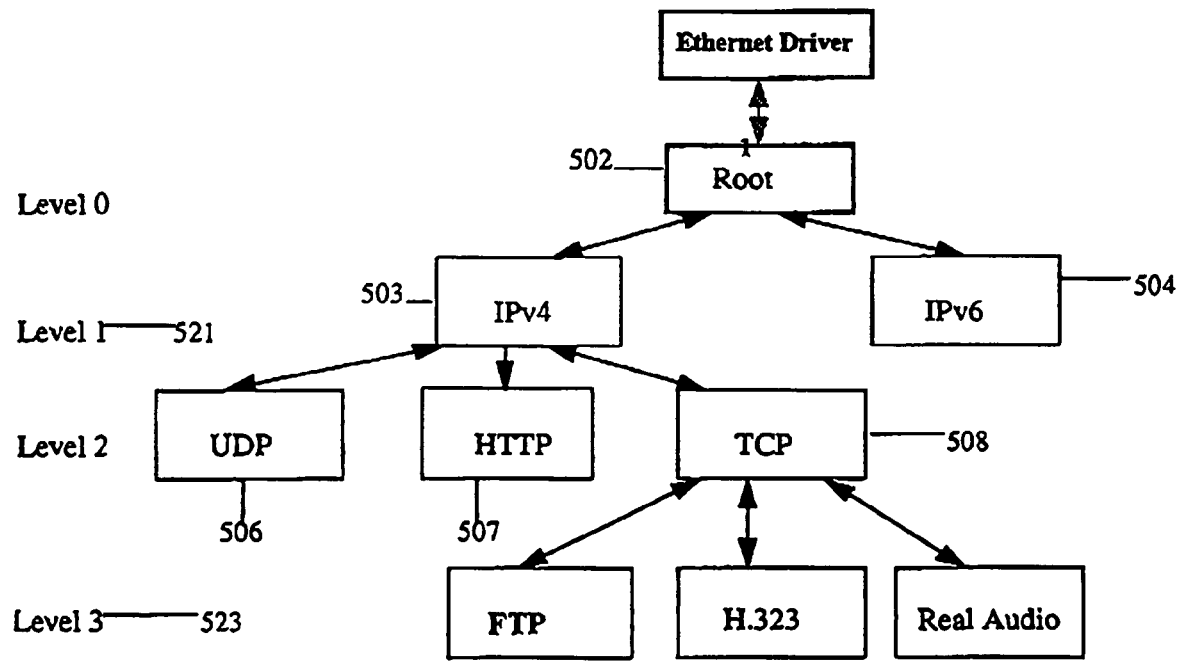
FIG. 5 shows an example of a packet classification and demultiplexing process in classifying a packet in accordance with the present invention.
Figure 6:
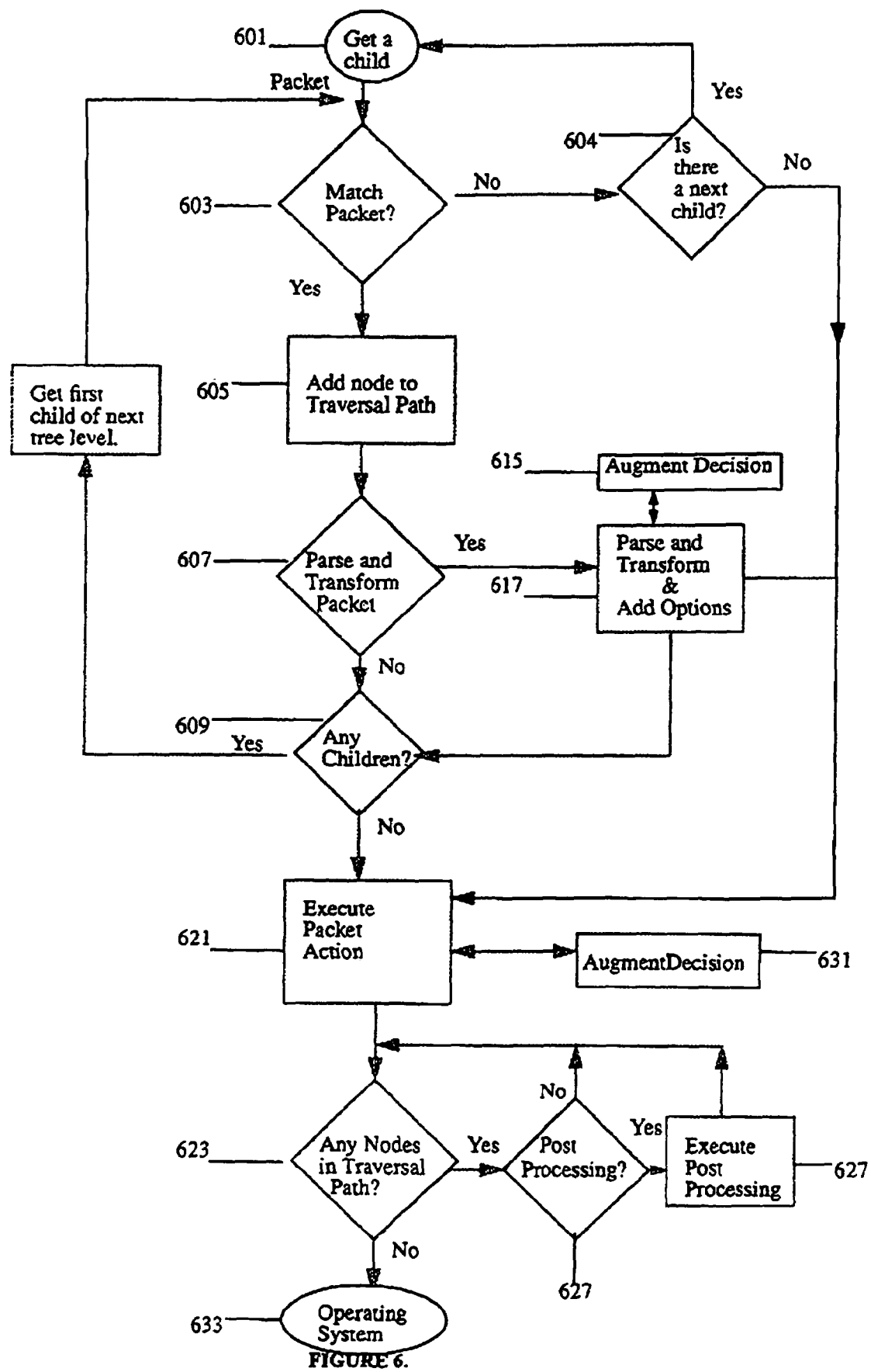
FIG. 6 shows an example of steps to determine the packet disposition in accordance with the present invention.

An example embodiment has 7 steps to classify a packet and determine the augmented packet disposition. These steps are in the interrupt context except where noted. Steps 1–4 describe the packet classification process shown in FIG. 5. Steps 5–7 describe augmenting the packet disposition process. A flow diagram for these seven steps is shown in FIG. 6. Refer to FIGS. 5 & 6 for the following description.

Step 1: After receiving a packet from the physical network, the Link Layer passes the packet to the root node 502.

In this step, a network driver receives a packet from the physical network, which it classifies based on frame type in the MAC header and passes it to the root node of the classification tree.

Step 2: The packet is passed to a first child node of the first level 521 of the classification tree, indicating a satisfaction of a node-criteria of the child node.

The root node asks each child node from left to right whether the packet matches its node-criteria, until a child node's node-criteria is satisfied. The root node then passes the packet to that first child node which satisfies the node-criteria and forms the data packet into a matched packet. In FIG. 5, the root node 502 first passes the packet to the IPv4 node 503. A child node's node-criteria includes a set of code used to identify the packets desired. This set of code is implemented as a function referred to as the packet matching function (pm) 603.

Figures 7, 8:
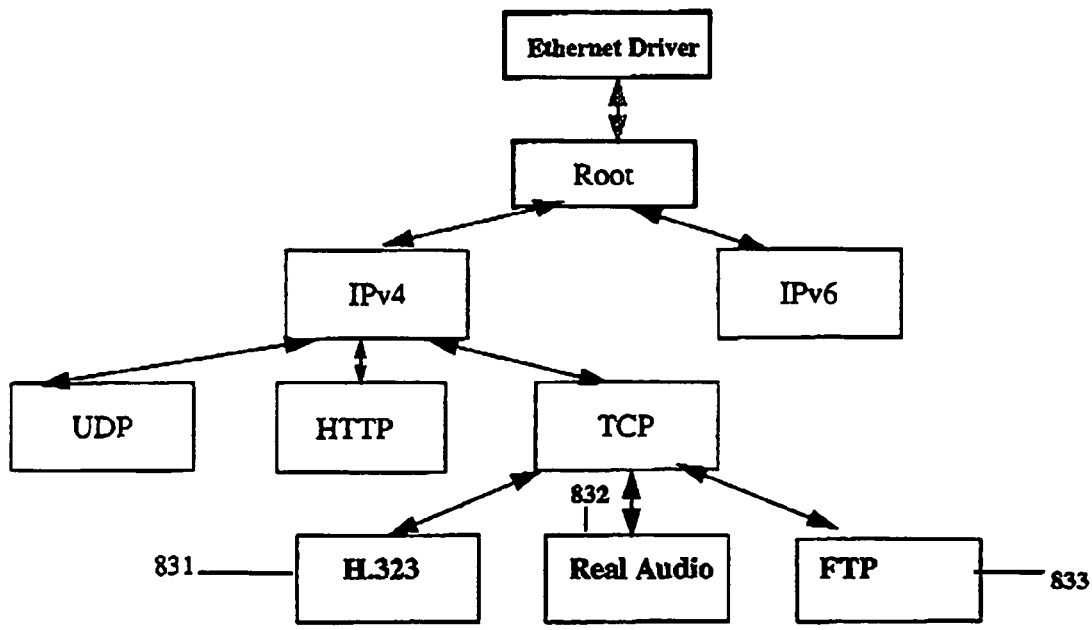
FIG. 7 shows an example of pm_t return codes in accordance with the present invention.
FIG. 8 shows an example of application dependent nodes in accordance with the present invention.

The input parameters to the pm function are: the PBUF, an operating system independent data structure containing the packet, the options memory area, and a pointer to the packet filter node. The result of the packet matching function, indicating satisfaction or lack there of, of the child node's node-criteria, is of type pm_t. FIG. 7 enumerates a sample group of type pm_t return code values 700. The packet matching function results indicating satisfaction of a child node's node-criteria include: Match_OK, Match_This, Match_Discard, and Match_Forward. The result indicating lack of satisfaction is NO_Match.

The packet matching function may be as simplistic as matching a static fixed offset, such as the IPv4 node, or as complex as identifying the packets for applications which negotiate additional connections, such as FTP, Real-Audio and H.323. Unfortunately, since each of these application has its own method for negotiating additional connections, application dependent nodes are required. This is as illustrated in FIG. 8 for H.323 831, Real-Audio 832, and FTP 833. For each additional connection, a dynamic filter rule is created. These dynamic filter rules and other state information for the negotiated connections are stored locally in the application specific node. One implementation uses a hashtable structure for storing this data. Based on the well known services port and the application specific data, the packet matching function identifies the packets desired enabling application level classification.

Step 3: Repeat the process of 'passing the packet' starting with a first child node of a next tree level of the classification tree which satisfies a node-criteria of that first child node, as described in step 2, and form the packet into a matched packet, until no child of a next tree level of the classification tree succeeds in satisfying a node-criteria (NO_Match).

A determination is made if there is a next child 604. If there is, flow continues with 601. If not, flow continues with 621. Thus, when the packet matching function of all of the children nodes of the next tree layer result in a lack of satisfaction, (NO_Match), the packet is said to have fully traversed the classification tree. The traversal path is defined as the set of nodes from the root to the last first child node satisfying a node-criteria of the child node. Thus packet classification has completed and flow continues with 621.

Step 4: For each first child node, satisfying a node-criteria of the child node form the data packet into a matched packet. This may be performed as in steps 4A, 4B and/or 4C.

Step 4A: The current node is added to the node traversal path 605.

Step 4B: The node may execute a set of code, if such a code exists, which may parse and transform the packet 607. If the set of code exists, the packet is parsed and transformed 617. If not, flow continues with 609.

Once a node's node-criteria is satisfied, the packet's traversal of the classification tree is limited to the node's descendants. The remainder of the classification tree is not traversed. But before traversing a node's subtree, the node may execute a set of code. In the present embodiment, this set of code is referred to as the packet preprocessor function (pp). The input parameters are the same as the packet matching function. This includes: the PBUF, an operating system independent data structure containing the packet, the options memory area, and a pointer to the packet filter node. The return code of the pp function is of type pp_t. Examples of type pp_t 900 are enumerated in FIG. 9. The packet preprocessor function may perform actions such as parsing a packet and transforming a packet. Parsing a packet generates information that may need to be made available to the node's descendants and ancestors. Transforming a packet takes place for example, when the IPSEC node's preprocessor transforms an encrypted packet into a decrypted packet. IPSec tunnel information and other information is created that can be used by other nodes in the classification tree.

The present invention thus provides a generic mechanism for retaining or passing state information between nodes by a mechanism we referred to herein as options passing.

In an example of option passing, an options memory segment is attached to each packet during its tree traversal. Each node may store and retrieve state using the APIs: fw_add_option, fw_next_option. Since a node may not understand all options that are passed to it, the node will process the options it understands and ignore those which it does not understand.

Step 4C: The node may also suspend the classification process in order to obtain additional external information so as to augment packet classification and demultiplexing 615.

Suspending the classification process involves queueing any data, including information about the packet or its present classification, and transferring the data to an application that is scheduled outside of the forwarding or interrupt context of the kernel.

One embodiment augments packet classification by suspending the packet classification process until the application, scheduled outside of the forwarding or interrupt context of the kernel, completes. The resulting external information is used to augment the packet classification.

Examples of applications which may augment packet classification include packet identification and authentication agents. An identification/authentication agent, may use s/ident for out of band identification and authentication. Authentication may use s/ident for out of band authentication in order to correlate the packet with a userid. Another example of authentication is to correlate a VPN tunnel id with a userid.

This external information, such as packet identification and/or authentication, permits packets to be handled differently. For example, assume that a site connected to the Internet is severely bandwidth limited. As a result only a limited number of employees at any given moment can run applications with high bandwith demands, such as streaming media. Based on the external information a site policy can be implemented which gives preferential treatment to a set of employees.

Step 5: After packet classification completes, a set of code associated with the last child node which satisfied the node-criteria, is executed.

In an embodiment, this set of code is referred to as the packet action function (pa). The packet action input parameters are: the PBUF, a pointer to the node, a pointer to the node traversal path, and the options memory area. An example of return codes of the pa function, of type paction_t are enumerated in FIG. 10 1000. The return code obtained determines the packet disposition.

Normally the packet action function 621 monitors the packet data in order to obtain application specific state information used by the other node functions. For example, a packet action function with application specific knowledge could monitor the packet data for new negotiated data connections. These new dynamic connections are stored locally in the application specific node. The packet matching function uses the dynamic data as part of the node-criteria for application level packet classification.

Other examples of packet action function usage include: modifying packets, which may be used to implement NAT; queueing packets, which may be used to shape traffic; dropping packets, which may be used for rate limiting; and redirecting packets, which may be used for load balancing.

The packet action function may also suspend kernel packet processing and transfer any data (including information about the packet or its classification) to an application that is scheduled outside of the forwarding or interrupt context of the kernel, and/or to obtain external information in order to augment the packet disposition (i.e. discard, forward, process locally or redirect) decision 631. Suspending the packet disposition decision process involves queueing any data, including information about the packet or its classification, and transferring the data to an application employing a process specific means that is scheduled outside of the forwarding or interrupt context of the kernel.

An example method of augmenting the packet disposition decision is to suspend any in progress packet disposition decision process until the application scheduled outside of the forwarding or interrupt context of the kernel completes. The resulting external information is used to augment the packet disposition decision. Examples of applications which may augment the packet disposition decision are policy enforcement and content filtering agents based on any combination of the packet classification, identification and authentication. Examples of process specific means include s/identd and external LDAP servers.

Once the application completes, it passes the original data, the external information and the results to the kernel, which issues a call to the node's callback function. The callback function(cb) reinserts the packet at the node which suspended the processing. Based on the application's results, dynamic rules may be created 621.

For example, an especially advantageous usage is with VPN tunnels. Differing policies based on the VPN callee are enforceable using dynamic rules. With application level classification, these rules are no longer limited to fixed pattern matches, such as protocol, but may be written in terms of applications. An example of an application level rule would be 'permit John Doe Real-Audio'. Application level rules would also simplify firewall rule definitions in firewall applications.

Step 6: After the set of code associated with the last child 2*d* node, which satisfied the node-criteria (referred to as the packet action code) completes, a set of code associated with each node in the node traversal path, is executed 623.

In the present embodiment, this set of code is referred to as the packet post processor function(px) 625. The packet postprocessing input parameters are the PBUF, the options memory area and the packet action disposition. The return code of the px function is of type paction_t. Examples of type paction_t are enumerated in FIG. 10.

Just as the packet preprocessing may decrypt a packet, the packet postprocessing may perform actions such as encrypting a packet 627. As the packet originally traversed the classification tree, the node traversal path was created. Before returning to the base operating system, in reverse node traversal order, packet postprocessing is executed.

Normally, the packet disposition is maintained through postprocessing. Only in unusual circumstances does the postprocessing not follow the recommended packet action and previous post processing disposition. For example, with VPN tunnels the outbound tunnel may have been torn down during the classification tree traversal.

Step 7: After the packet processing completes, control returns to the base operating system, which discards, forwards, redirects or locally processes the packet, based on the final disposition 633.

Figure 11:
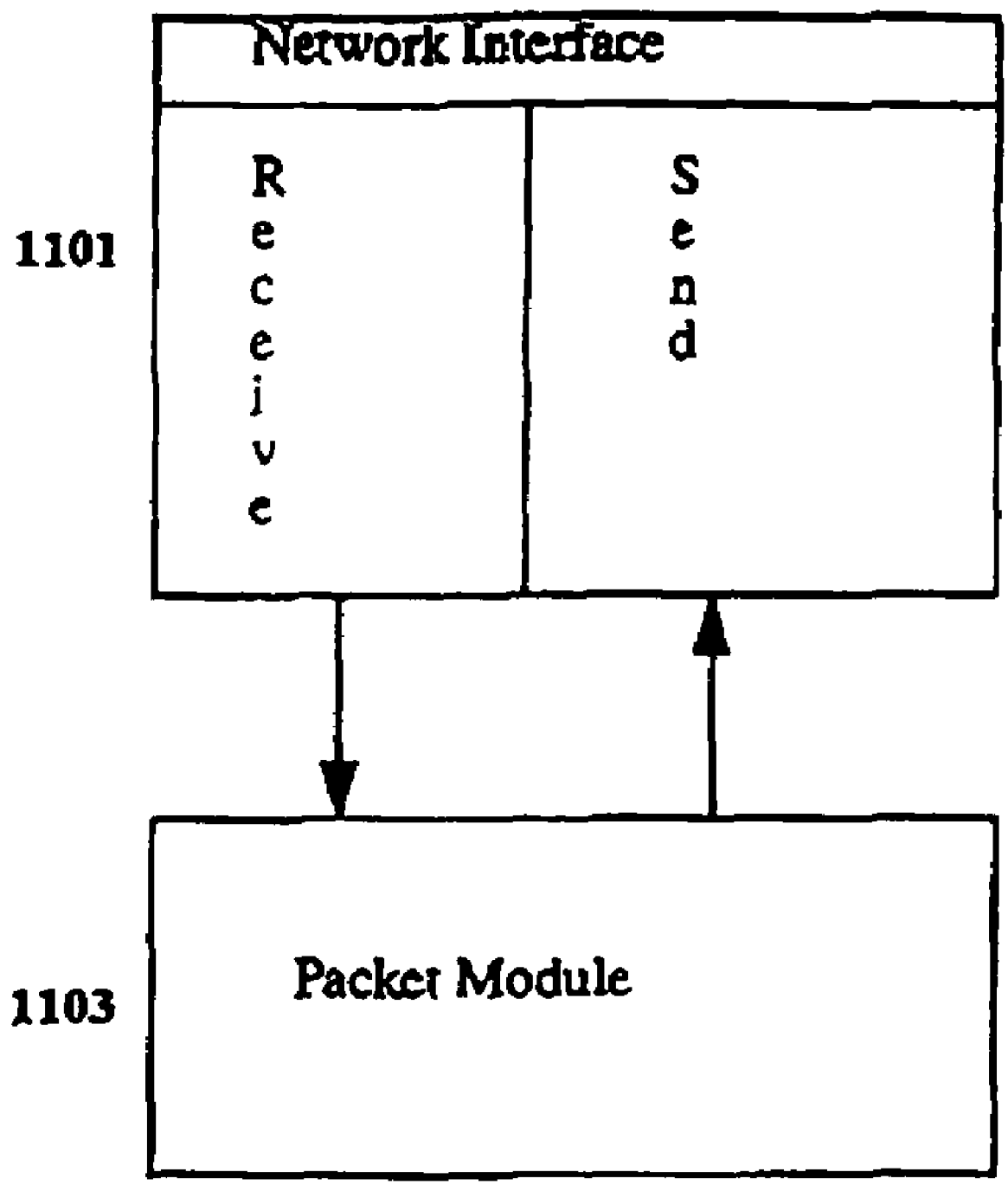
FIG. 11 shows an example of an apparatus in accordance with the present invention.

FIG. 11 shows an example embodiment of the present invention as an apparatus to classify and/or augment the disposition of a data packet shown in FIG. 11. The apparatus includes a network interface device (1101) to receive a packet from the physical network and pass the packet to a root node of a classification tree, and the reverse, to receive a packet from the root node and send a packet to the physical network. The apparatus also includes a packet module (1103) to successively pass the packet from child node to child node on each tree level until a first child node of a tree level of the classification tree indicates a satisfaction of a node-criteria of that first child node. The first child node forms the data packet into a matched packet until no first child node of a next level at a succeeding next level indicates satisfaction of the node-criteria of the first child node of the next level.

It is noted that an accelerator chip can be used to implement the packet module (1103). This chip can be used as the basis of a firewall box, a border server, or as an application level classification system such as needed when diagnosing high speed networking problems.

Other apparatus embodiments of the present invention may be implemented in ways known to those familiar with the art. For example, the invention may be implemented using an apparatus for classifying a data packet. This apparatus includes: means for receiving the data packet at a root node of a classification tree; means for successively passing the data packet to each child of a first tree level until a first child node of the first tree level of the classification tree indicates a satisfaction of a node-criteria of said first child node, and the first child node forming said data packet into a matched packet; and means for repeating the steps of passing and forming for a next tree level until no first child node of said next tree level at a succeeding next level indicates satisfaction of the node-criteria of said first child node of said succeeding next level. This apparatus may, for example, be in the form of a floppy or hard disk, flash memory, or external magnetic media, etc.

Another example embodiment of the present invention is an apparatus for determining disposition of a packet received at a child node. This apparatus includes: an interrupt context of a control program, with the child node existing within the interrupt context; an external process outside of the interrupt context of the control program; means for passing said packet and a first disposition of said packet to the external process, the external process to augment the packet disposition by employing a process specific means and to return an augmented packet with an augmented disposition to the child node; and the interrupt context including means for receiving the augmented packet and the augmented disposition from the external process. This apparatus may, for example, also be in the form of a hard disk, a floppy disk, or external magnetic media, etc. A control program may be implemented as software that manages the example apparatus.

The present invention can be realized in hardware, software, or a combination of hardware and software. The present invention can be realized in a centralized fashion in one computer system, or in a distributed fashion where different elements are spread across several interconnected computer systems. Any kind of computer system—or other apparatus adapted for carrying out the methods described herein—is suited. A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which—when loaded in a computer system—is able to carry out, or cause the carrying out of these methods.

Computer program means or computer program in the present context mean any expression, in any language, code or notation, of a set of instructions intended to cause a system having an information processing capability to perform a particular function either directly or after either or both of the following:

1. conversion to another language, code or notation; and/or
2. reproduction in a different material form.

It is noted that the foregoing has outlined some of the more pertinent objects and embodiments of the present invention. The concepts of this invention may be used for many applications. Thus, although the description is made for particular arrangements and methods, the intent and concept of the invention is suitable and applicable to other arrangements and applications. For example, although reference is made to a data packet, the invention is similarly applicable to a non-data packet. It will be clear to those skilled in the art that other modifications to the disclosed embodiments can be effected without departing from the spirit and scope of the invention. The described embodiments ought to be construed to be merely illustrative of some of the more prominent features and applications of the invention. Other beneficial results can be realized by applying the disclosed invention in a different manner or modifying the invention in ways known to those familiar with the art. Thus, it should be understood that the embodiments has been provided as an example and not as a limitation. The scope of the invention is defined by the appended claims.

The invention claimed is:

1. A method for classifying a data packet, the method comprising:
   receiving the data packet at a root node of a classification tree;
   successively passing the data packet to each child of a first tree level until a first child of the first tree level of the classification tree indicates a satisfaction of a node-criteria packet matching function of said first child and the first child forming said data packet into a matched packet; and
   repeating the step of passing and forming for a next tree level until no first child of said next level at a succeeding next level indicates satisfaction of the node-criteria packet matching function of said first child of said next level.

2. A method as recited in claim 1, wherein the step of passing includes executing a set of code which returns a status indication.

3. A method as recited in claim 2, wherein the status indication is of the pm_t type.

4. A method as recited in claim 1, wherein the step of forming includes the first child specifying a set of code to be run subsequently.

5. A method as recited in claim 4, wherein the step of specifying includes specifying the set of code to be run following satisfaction.

6. A method as recited in claim 1, further comprising dynamically adding at least one node in at least one level of the classification tree.

7. A method as recited in claim 6, wherein said at least one new child node is a Real Audio node.

8. A method as recited in claim 1, further comprising the step of parsing said matched packet and generating relevant information.

9. A method as recited in claim 1, further comprising the step of transforming said matched packet into a transformed packet.

10. A method as recited in claim 1, further comprising associating the packet with a last first child indicating satisfaction.

11. A method as recited in claim 10, further comprising executing a set of code in accordance with said last first child.

12. A method as recited in claim 1, further comprising determining a disposition of the data packet.

13. A method as recited in claim 12, further comprising employing the classification process as a firewall.

14. A method as recited in claim 1, further comprising employing the classification process for dynamic application level classification.

15. A method as recited in claim 14, further comprising employing the classification process for policy enforcement.

16. A method as recited in claim 14, further comprising employing the classification process for rate limiting.

17. A method as recited in claim 14, further comprising employing the classification process for load balancing.

18. A method as recited in claim 1, further comprising employing the classification process to shape traffic.

19. An apparatus to classify a data packet, the apparatus comprising:
- a network interface device to receive the data packet from the physical network and pass the data packet to the root node of a classification tree, and the reverse, to receive the data packet from the root node and send the data packet to the physical network;
- a packet module to successively pass the packet from child node to child node at a next tree level until a first child node of the next tree level of the classification tree which indicates a satisfaction of a node-criteria of the first child node, and to form the data packet into a matched packet until no first child node of at a succeeding next level indicates satisfaction of the first node-criteria of the first child node of the succeeding next level.

20. An apparatus as recited in claim 19, wherein a portion of the apparatus is implemented as an accelerator chip.

21. An apparatus as recited in claim 19, wherein the apparatus is employed for application level classification.

22. An apparatus as recited in claim 19, wherein the apparatus is employed as a firewall.

23. An apparatus as recited in claim 19, wherein the apparatus is employed as a border server.

24. An article of manufacture comprising a computer usable medium having computer readable program code means embodied therein for causing classification of a data packet, the computer readable program code means in said article of manufacture comprising computer readable program code means for causing a computer to effect the steps of claim 1.

25. An article of manufacture as recited in claim 24, the computer readable program code means in said article of manufacture further comprising computer readable program code means for causing a computer to effect dynamically adding at least one node in at least one level of the classification tree.

26. An apparatus for classifying a data packet, the apparatus comprising:
- means for receiving the data packet at a root node of a classification tree;
- means for successively passing the data packet to each child of a first tree level until a first child node of the first tree level of the classification tree indicates a satisfaction of a node-criteria of said first child node, and the first child node forming said data packet into a matched packet; and
- means for repeating the steps of passing and forming for a next tree level until no first child node of said next tree level at a succeeding next level indicates satisfaction of the node-criteria of said first child node of said succeeding next level.

* * * * *